Patented Feb. 9, 1926.

1,572,625

UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS.

No Drawing.   Application filed January 7, 1921.   Serial No. 435,739.

*To all whom it may concern:*

Be it known that I, WILLIAM CHITTENDEN TAYLOR, a citizen of the United States of America, and a resident of Corning, New York, have invented certain new and useful Improvements in Glass, of which the following is a specification.

The basis of this invention is the discovery that the addition of certain alkali metal halides (i. e. the alkali metal fluorides, chlorides, bromides, and iodides) or halogen salts of other elements to a glass batch or melted glass containing certain mineral coloring oxides or salts, effects certain modifications in the colors which would otherwise be produced by such oxides or salts in the resultant glass, and that by varying the ratio of the halide salt to the metallic oxide or salt, and further by varying the ratio existing between the alkali, silica, and boric oxide contents of a boro-silicate glass, many different colors may be obtained by the use of the same metallic oxide or salt.

The effects of such halide salts are most notable with glasses containing a very high percentage of boric oxide, where cobalt is used as the coloring oxide, and where some salt of chlorine is used as the agent to produce the color change. Less effect is noted in glass low in boric oxide, but the aforementioned effect of halide salts is not confined exclusively to borosilicate glasses. Phosphate glasses especially are quite noticeably affected by the halides. Less effect is noted if a salt of bromine is used to replace the salt of chlorine, and only a slight effect if salts of fluorine or iodine are used instead of salts of chlorine. For this reason I prefer to use a halogen whose atomic weight is over 20 and under 80 (i. e. to use salts of chlorine or bromine). If coloring agents other than cobalt oxide or nickel oxide are used with halogen salts in borosilicate glasses usually less marked changes in color are produced, but most coloring materials in such glasses are affected to some extent by one or more of the halogens. The color due to oxide of nickel is noticeable in the amount of change produced, the yellow color produced by nickel oxide in a high boric oxide glass being converted to a violet color by the use of chloride salts. Other coloring agents such as manganese dioxide, iron oxide, copper oxide, chromium oxide, vanadium oxide, neodymium oxide, and uranium oxide seem to be much less effected by the halides.

In general the effect of increasing the percentage of boric oxide in glasses colored by various metallic salts is to cause decreased absorption at the red end of the spectrum namely in the red and yellow. This change in spectral absorption tends usually to convert the apparent hue of the glass in the direction of yellow or amber, or else to cause a less distinctive or so called less saturated color. If greater amounts of coloring agent are added a more distinctive color can usually be obtained but at the expense of transmission. As illustrating the changes produced in color when larger percentages of boric oxide are introduced into ordinary glasses the blue purple produced by cobalt oxide is modified in such glasses to red purple, the red purple produced by nickel oxide is modified in such glasses to amber, the red purple produced by manganese dioxide is modified in such glasses to amber, the blue green produced by copper oxide is modified in such glasses to yellow green, the green produced by iron oxide is modified in such glasses to amber, the green produced by chromium oxide is modified in such glasses to yellow, the green produced by vanadium oxide is modified in such glasses to amber, the violet tint produced by neodymium oxide is modified in such glasses to flesh tint.

In general, although this does not hold for all coloring salts, the effect of adding halogen salts to said colored borosilicate glasses is to reverse the effect of boric oxide. In the case of cobalt and chloride salts the reversal is carried beyond the color of the boric-oxide-free glass, so that in such glasses a better blue and in some cases green transmission can be obtained for a given red absorption than is the case in glasses free from boric oxide. It is a matter of common knowledge that a good blue cannot be obtained with cobalt oxide alone. Even in potassium silicate glasses, the most favorable for this purpose, cobalt alone gives a blue transmitting enough red to be called purple, and oxide of copper is used with cobalt to produce blue. By this invention, I am able to produce blue and even in extreme types of glasses to produce a distinct green without any coloring oxide other than cobalt.

Taking the use of alkali chloride in borosilicate glasses containing cobalt oxide as illustrating the most striking feature of my invention, I find that the color changes produced are dependent on several factors, namely the ratio of alkali, to boric oxide, to silica; the percentage of cobalt oxide, the percentage of chloride added to the batch, and the percentage of chloride retained in the glass, and the percentage of other constituents. Either of the three alkali metals, potassium, sodium, or lithium may be used.

In general the higher the percentage of boric oxide present the more extremely red the color produced by cobalt, and the more inclined to green when cobalt and chloride are both present. Although boric oxide seems to be the factor of most influence, the per cent of alkali is also important, in general the better red absorption being produced when alkali is high, although the extreme color change produced by chlorides may not be as great. The effect of adding other oxides to the alkali borosilicates tends to nullify the effect of chlorides. This does not hold true, however, for alumina or for small amounts of arsenic oxide. Barium salts have only a slight effect, but lead, lime, magnesia, zinc, antimony, phosphorus and zirconium salts are all more or less injurious to the effect of chlorides as are also most of the coloring oxides. This holds true in the case of cobalt itself, changes produced by chlorides being most marked the lower the percentage of cobalt. The higher the percentage of chloride the more marked the effect.

The halogen has been described as added to the batch in the form of an alkali metal halide, as this is believed to be the most practical manner of introducing it, but I do not limit my invention thereto, and in the following claims include under the term salts the use of any salt or compound containing any of the halogens, fluorine, chlorine, bromine or iodine. Although chlorine is far more important in its effect on cobalt colors, a lesser effect is also produced by bromine and some effect is also produced by fluorine and iodine. Moreover, the other halogens fluorine, bromine, and iodine produce different effects in other metallic salts than those of cobalt, so that they may be of value in obtaining other colors or combinations of other colors with cobalt colors.

As illustrating my invention the following batch formulas are given:—

|   | Silica $SiO_2$ | Boric oxide $B_2O_3$ | Alkali as potash $K_2O$ | Alumina $Al_2O_3$ | Cobalt oxide $Co_2O_3$ | Nickel oxide NiO | Alkali as soda $Na_2O$ |
|---|---|---|---|---|---|---|---|
| 1 | 15 | 80 | | | .1 | | 5 |
| 2 | 47 | 39 | 11 | 3 | .1 | | |
| 3 | 47 | 39 | 11 | 3 | | .1 | |
| 4 | 47 | 39 | 11 | 3 | .2 | | |
| 5 | 66 | 32 | 2 | | .2 | | |
| 6 | 55 | 31 | 14 | | .1 | | |
| 7 | 55 | 31 | 14 | | | .1 | |
| 8 | 68 | 24 | 8 | | .2 | | |
| 9 | 76 | 19 | 5 | | .2 | | |
| 10 | 70 | 12 | 18 | | .1 | | |
| 11 | 65 | 23 | 7 | 5 | .3 | | |
| 12 | 65 | 23 | 7 | 5 | | .1 | |

By adding 97 parts of batches of the above formulæ to 3 parts of potassium chloride and melting, glasses will be produced having in plates 6 mm. thick, when viewed by transparent light from a tungsten filament lamp, the following colors as contrasted with the colors of such glass without the chloride.

|   | Color with KCl added | Color without KCl |
|---|---|---|
| 1 | Green. | Red. |
| 2 | Green. | Red. |
| 3 | Indigo. | Lemon yellow. |
| 4 | Blue green. | Red. |
| 5 | Blue. | Red inclined to purple. |
| 6 | Blue. | Red purple. |
| 7 | Violet. | Yellow. |
| 8 | Blue. | Red purple. |
| 9 | Blue purple. | Red purple. |
| 10 | Blue. | Blue purple. |
| 11 | Blue. | Red purple. |
| 12 | Amber. | Amber. |

In the above formulæ soda ($Na_2O$) and sodium chloride may be substituted for potash ($K_2O$) and potassium chloride in molecular percentages respectively without effecting the described colors. Lithia ($Li_2O$) and lithium chloride may be also substituted for potash and potassium chloride, but with not quite as effective results. I do not desire to limit myself as to amount of chloride used or amount of cobalt oxide used, the percentage of each of these being dependent on color desired and the per cent of chloride added also depending on melting conditions. Neither do I desire to limit myself to the formulas above given as the invention applies to all glasses containing alkali and boric oxide.

I have heretofore particularly stressed the change in color due to cobalt or nickel oxide when used in a high boron content glass containing the specified halogens, and in the following claims I include these metallic oxides and exclude others by the expression "a salt of an element of the eighth periodic group having an atomic weight between 58 and 59."

Having thus described this invention, what is claimed is:—

1. The hereinbefore described process of modifying the colors due to metallic salts in borate glasses, which comprises adding a halogen.

2. A glass containing silica, alumina, boric oxide, a halogen and a metallic coloring element, the normal color of whose oxide is modified by the halogen.

3. A glass batch containing silica, alumina, boric oxide, a halogen containing substance and a metallic salt, the normal color of whose oxide is modified by the halogen.

4. The hereinbefore described process of modifying in glasses the colors due to cobalt-oxide, which comprises adding a substance containing a halogen whose atomic weight is over 20 and under 80.

5. The hereinbefore described process of modifying in borate glasses the colors due to cobalt-oxide, which comprises adding a substance containing a halogen.

6. The hereinbefore described process of modifying in glasses the colors due to cobalt-oxide by adding a substance containing chlorine.

7. The hereinbefore described process of modifying in borate glasses the colors due to the cobalt-oxide, by adding a substance containing chlorine.

8. A glass batch containing silica, alkali, boric-oxide, a salt of cobalt and an alkali-metal chloride.

9. The hereinbefore described process of modifying the colors due to a salt of an element of the eight periodic group having an atomic weight between 58 and 59, which comprises adding a substance containing a halogen whose atomic weight is over twenty and under eighty.

10. A glass containing silica, alkali, boric oxide, a halogen whose atomic weight is over twenty and under eighty, and a salt of an element of the eighth periodic group having an atomic weight between 58 and 59.

In testimony whereof, I hereunto affix my signature this 5th day of January 1921.

WILLIAM CHITTENDEN TAYLOR.